(No Model.)

A. JOHNSON.
ECCENTRIC TOOL AND WORK HOLDER.

Patented Apr. 14, 1891.

Witnesses:
Jean Elliott
Julia Usher

Inventor:
Andrew Johnson
By Burton and Burton
Attorneys

(No Model.)

A. JOHNSON.
ECCENTRIC TOOL AND WORK HOLDER.

No. 450,234. Patented Apr. 14, 1891.

Witnesses:
Jean Elliott
Julia Usler

Inventor
Andrew Johnson
By Burton and Burton
Attorneys (No Model.) 5 Sheets—Sheet 5.

A. JOHNSON.
ECCENTRIC TOOL AND WORK HOLDER.

No. 450,234. Patented Apr. 14, 1891.

Witnesses:
Jean Elliott
Julia Usher

Inventor:
Andrew Johnson
By Burton and Burton
Attorney.

UNITED STATES PATENT OFFICE.

ANDREW JOHNSON, OF CHICAGO, ILLINOIS.

ECCENTRIC TOOL AND WORK HOLDER.

SPECIFICATION forming part of Letters Patent No. 450,234, dated April 14, 1891.

Application filed April 25, 1890. Serial No. 349,493. (No model.)

*To all whom it may concern:*

Be it known that I, ANDREW JOHNSON, a citizen of the United States, residing at Chicago, county of Cook, and State of Illinois, have invented certain new and useful Improvements in an Eccentric Tool and Work Holder, which are fully set forth in the following specification, reference being had to the accompanying drawings, forming a part thereof.

The purpose of this invention is to provide novel means for communicating rotary motion eccentrically with respect to the axis whereabout it originates in such manner that the center or axis of the communicated motion may be shifted constantly or at will without interrupting the rotary motion, the same device being adapted for use as a work-holder and for other purposes, as hereinafter explained.

In the drawings, Fig. 10½ is a perspective of a trammel for this modification. In Figs. 14 and 15 details not necessary to illustrate the invention are omitted and many parts broken away to show those which pertain more immediately to the feature to be illustrated.

Figure 1:
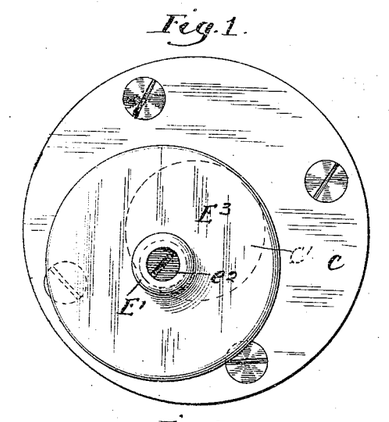
Figure 1 is a plan of my device disconnected from any machine, the form being that which is adapted for a toolholder or chuck for the lathe or drill-press.
Figure 2:
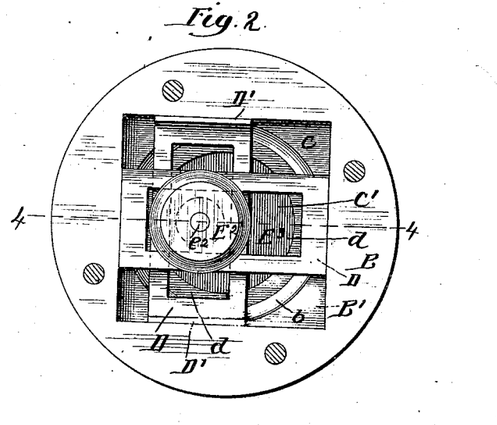
Fig. 2 is a plan of the device with the baseplate removed, showing the interior mechanism.
Figure 3:
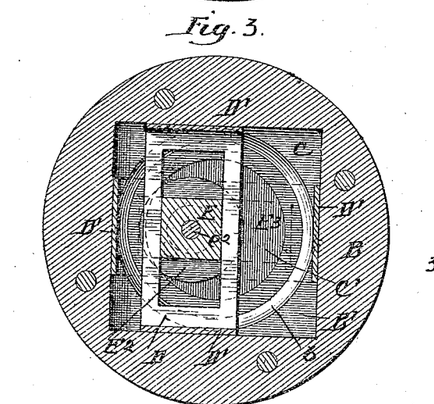
Fig. 3 is a section at the line 3 3 on Fig. 4.
Figure 4:
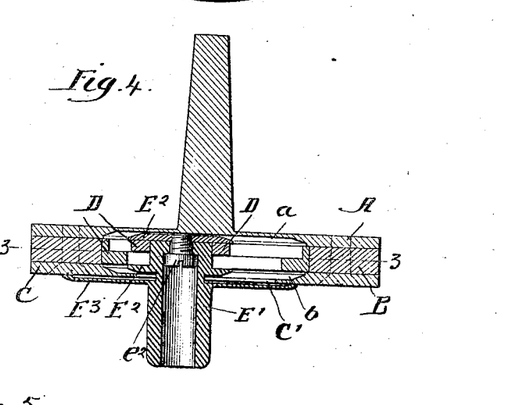
Fig. 4 is a section at the line 4 4 on Fig. 2.
Figure 5:
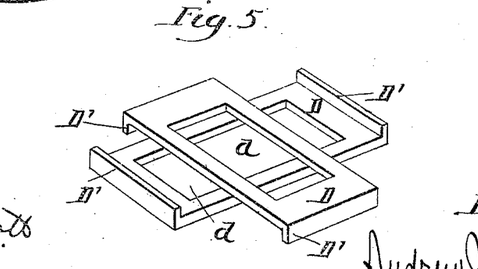
Fig. 5 is a perspective of the two trammels or sliding guides which control the movement of the chuck.
Figures 6, 7, 8, 9, 10:
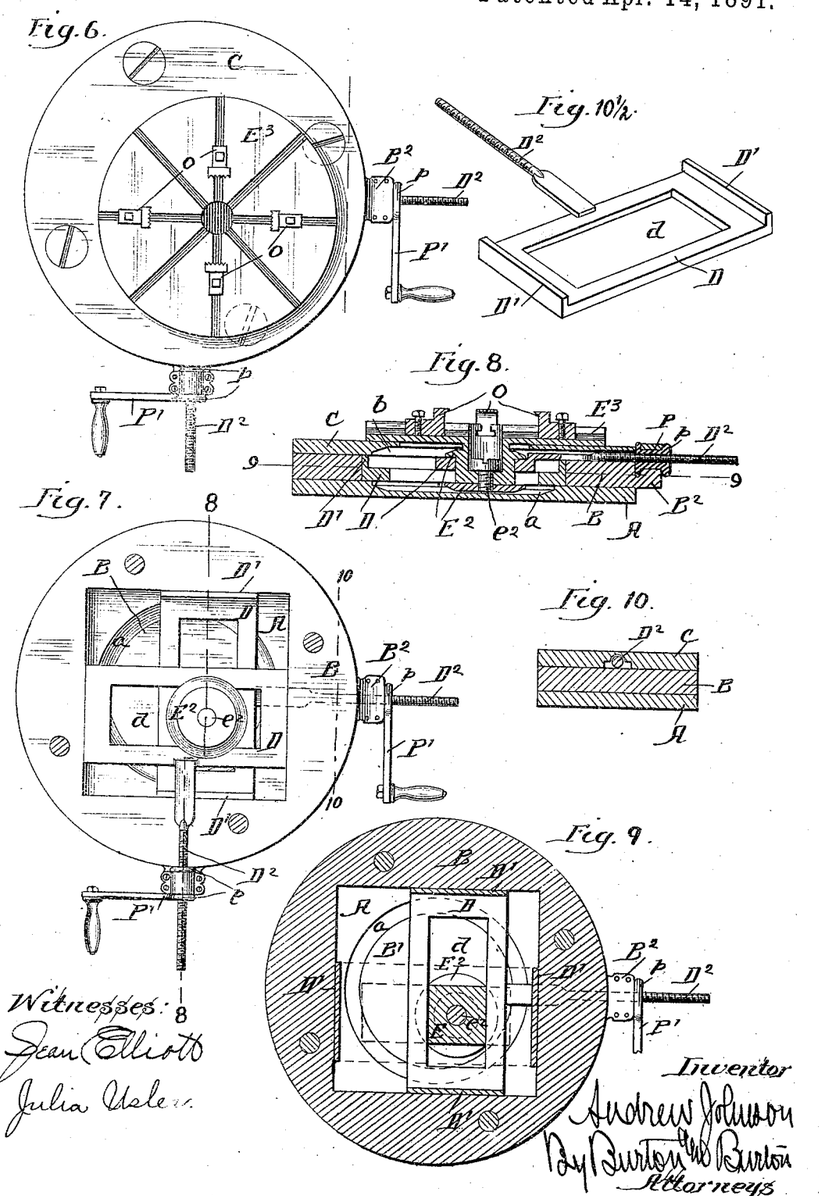
Fig. 6 is a plan of the modification of the device shown in the preceding figures to adapt the implement to be used as a bed or work-holder in a drill-press or similar machine or as a fixed head in a lathe.
Fig. 7 is a plan of the same with the face-plate removed.
Fig. 8 is a section at the line 8 8 on Fig. 7.
Fig. 9 is a section at the line 9 9 on Fig. 8, the position of the device and the direction of view being the same as in Fig. 7.
Fig. 10 is a section at the line 10 10 on Fig. 8.

A is the base-plate, which is adapted to be secured at its center to the revolving shaft from which the motion is to be derived, and in case the device is to be used for light work it may be secured in an ordinary chuck-head of a lathe or drill-press, and for that purpose it may be provided with a tapering spindle A', as indicated in Fig. 4. B is the trammel guide-block. It is a metal block of thickness corresponding to the grade and size of work to be done with the tool, regard being had to the necessary strength merely. Said block has an opening through it which, as illustrated, is square, but which is only necessarily parallelogrammic when two trammels are employed, as hereinafter described, and when only one trammel is used it only necessarily has two opposite sides parallel. The center of this opening corresponds with the center of the spindle or shaft of the tool. This trammel guide-block is made fast to the baseplate by screws which pass through it and bind it also to the face-plate C, which is similar to the base-plate, except that it has at the center a circular opening C', instead of a spindle or hub, with which the base-plate is provided as a means of attaching it to the power-shaft or revolving head. Both the face-plate and base-plate are concaved or hollowed about the center of surfaces which face the trammel guide-block to guide the trammel-retaining flanges hereinafter described.

D D are "trammels," as I term them. As illustrated, but not necessarily, they are precisely alike, each trammel being an oblong frame, which is shown rectangular, but which it is only necessary should be formed with two opposite ends parallel. Said frame is made of metal and has an oblong opening $d$, which is shown rectangular, but which it is only necessary should have two opposite sides parallel and in a direction transverse to that of the parallel ends of the said trammel. These trammels have at their ends the flanges D' D'. The trammels, exclusive of the flanges, are each in thickness half the thickness of the trammel guide-block, and the flanges D' are equal in height to the remaining thickness of the trammel, so that the entire height or thickness of the flanged ends of each trammel is equal to the thickness of the trammel-block; or, considering the trammel guide-block and base-plate as a unit and the opening in the trammel guide-block as a cavity in the unitary structure made up of that block and base-plate, the sum of the thickness of the two trammels is equal to the depth of that cavity. The lengths of the trammels, respectively, measuring between the parallel ends at right angles to those ends, correspond to the dimensions of the parallelogrammic opening in the trammel-block, otherwise named "cavity" in the base, said dimensions being equal when that opening is square, as illustrated, and the two trammels are laid in said opening crosswise of each other and facing each other—that is, having the faces from which the flanges D' project at the ends contacting each other, so that the flanges of each trammel project past the edges of the other trammel. The purpose of these flanges is merely to give broader bearing to the trammels as they slide in and are guided by the opposite parallel sides of said opening.

E is the trammel-block, which is parallelogrammic when two trammels are employed. As illustrated, its dimensions correspond to the widths of the openings in the trammels, respectively, and being therefore square when those openings are equal, as illustrated. The height or thickness of the trammel-block is equal to that of the trammel guide-block or depth of the cavity in the base, which is made up on the base-plate and said guide-block. It is equal, therefore, to the sum of the thickness of the two trammels as they lie crossing each other. It is adapted, therefore, to pass through them both, occupying the space which is outlined by the parallel sides of one trammel in one direction and the parallel sides of the other trammel in the opposite direction as they lie across each other.

This trammel-block is preferably made rigid with the shifting chuck or tool holder E', and is provided with the two flanges $E^2$, between which the trammels are embraced and by which they are retained securely in position, one of said flanges being removable and secured by a screw $e^2$ to the trammel-block. To accommodate these flanges in the movement which will hereinafter be described, circular cavities $a$ and $b$, respectively, are formed upon the inner surfaces of the base-plate and the face-plate, respectively. Rigid with the trammel-block there is also the guard-plate or covering-flange on the side toward the tool-holder outside the face-plate and in contact therewith. The diameter of this covering-flange or guard-plate is such that the opening C' would be covered by it at all positions of the holder.

Figures 11, 12, 13, 16, 17:
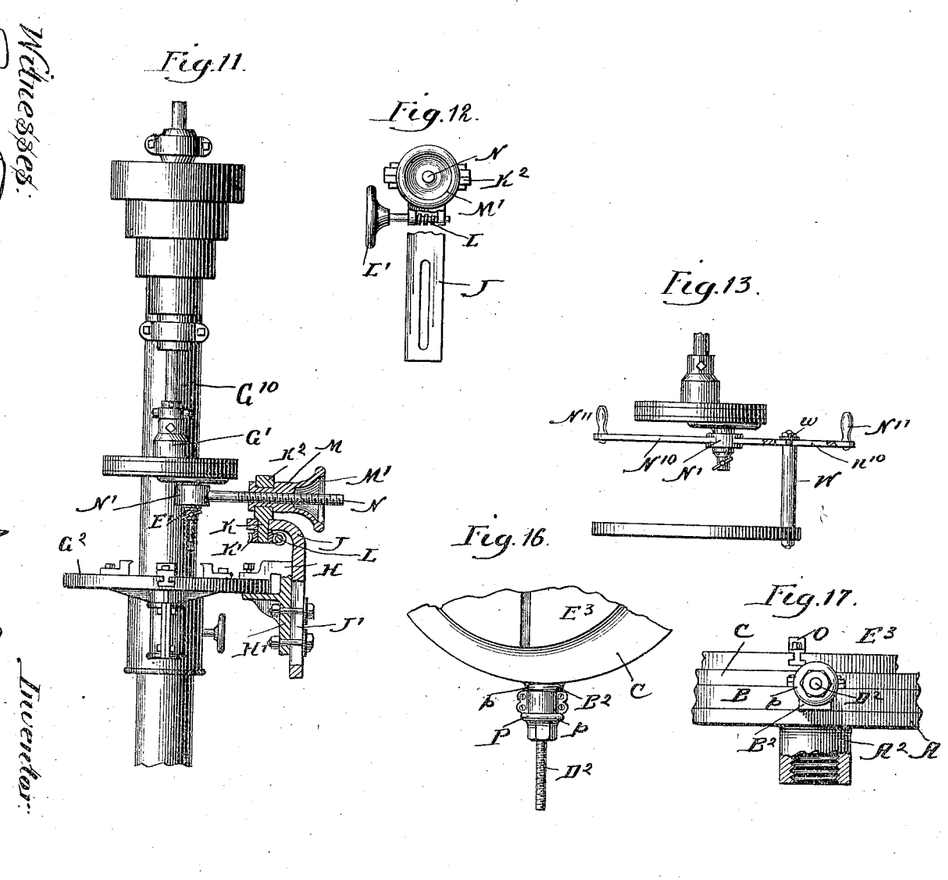
Fig. 11 is a front elevation of a drill-press having my device attached as the tool or chuck holder and showing means for adjusting the position of the tool and for shifting its position continuously or at will during work, the adjusting devices being shown in vertical section.
Fig. 12 is a side elevation of the attachment for controlling my tool-holder in the drill-press illustrated in Fig. 1.
Fig. 13 is a detail front elevation of a simple device adapted to be operated by hand for shifting the tool-co   or while it is rotating.
Fig. 16 is a plan or face elevation of the device shown in Fig. 6, with a slight modification as to the mode of adjusting to adapt it to be used as a rotating head instead of a fixed head.
Fig. 17 is an edge elevation of the same.

The parts above described are assembled in a manner indicated in the drawings—that is to say, the trammel guide-block is placed upon the face-plate. The trammel-block, having rigid with it the guard-plate, is entered through the circular opening in the face-plate, and the trammels are then placed thereon in the square opening in the trammel guide-block and secured in that position by the removable flange $E^3$, and the base-plate is then applied from the back side of the trammel guide-block and secured by means of screws, which pass through said face-plate and through said trammel guide-block and into the base-plate, binding the entire structure together. When thus assembled, the device is ready for use or for connection to a machine wherein it may be used as a tool-holder with a shifting center. In Fig. 11 it is illustrated as connected in the usual position of securing the chuck in the vertical head of a drill-press. In case of heavy work it would be necessary to provide means for securing it rigidly; but in light work it may be secured in the ordinary manner in which a chuck is secured in such positions—that is, by a tapering spindle being forced into the tapering head.

In order to adapt the device to be used as a shifting or adjustable tool-holder, it is necessary to provide a shifting or adjustable bearing for the holder E'. This may be done by means of an arm secured in any way upon the bed or frame of the machine, having an eye at the end adapted to serve as a bearing for the chuck or tool holder E'. Such arm may be secured in a very simple manner, as by a clamping-bolt passing through a slot on the arm, and having a binding-shoulder to engage above the arm, such bolt being loosened to permit the shifting of the arm and thereby the tool-holder to a new position. The device shown in Fig. 13 may be used in this manner.

In order to allow for the vertical movement of the tool in drilling, the holder E' should be long enough to allow range of vertical movement through the eye N' equal to the depth of hole to be drilled. When the tool-holder is set eccentrically with respect to the chuck-head G', the rotary motion of the chuck-head and of the entire implement above described will produce rotary movement of the holder about its own axis in the bearing thus provided for it on the arm $N^{10}$, the trammels sliding in the trammel-block as the latter revolve about the center of the opening therein to accommodate the eccentric position of the holder, the trammel-block controlled by the trammels fitting it, compelling the rotation of the holder as the said trammels are rotated about the center of the trammel-block.

In order to use this tool for executing engraving or irregular figures or for cutting mortises or similar work, a more complete device for shifting the bearing of the tool-holder is necessary, and such a device is illustrated in Fig. 11. As thus illustrated, $G^{10}$ is the press, standard supporting the usual mechanism for operating the drill-head G'. $G^2$ is the work bed or table provided in the usual manner with means for holding the work by dogs. H is a bracket provided expressly for the purpose of attaching to the press the means which I am about to describe for operating my improved implement. This bracket is adapted to be bolted to the bed through any of the openings in the latter which are provided for the purpose of fastening the work or to be clamped onto its edge, and when thus secured it is designed to be rigid with the bed. This bracket has a vertical arm H', to which is fastened the frame J, said bracket having also a vertical arm J', which is longitudinally slotted, and being secured to the arm H' of the bracket H by bolts which pass through said slot and enter said arm H', the slot allowing the bracket J to be adjusted vertically, as the exigencies of the work may require. In the outer extremity of the bracket J there is journaled in a vertical bearing a shaft K, which has at its lower end a worm-wheel K', which is engaged by the worm L, journaled horizontally on the bracket J. Said worm is provided with a handle L', by which it may be rotated to operate the shaft K. Above its bearing in the bracket J the shaft K has secured to it or made integral with it the under half of a journal-box $K^2$, in which is journaled a sleeve M, suitably retained by the upper half of the journal-box, said sleeve being prevented from moving longitudinally in the journal-box by its flanges on each side of said journal-box, and having a handle M' by which it may be rotated, and interiorly threaded axially to receive the screw-shafts N, upon one end of which is the eye N', which forms a bearing for the tool-holder E'. It will be observed that by rotating the two handles L' and M' the eye N' may be made to assume any position about the axis of the shaft K within the range of the longitudinal adjustability of the shaft N, and the eye being made to receive the tool-holder serves as the means for adjusting the latter to any position within the range of adjustment permitted by the trammels and affording a bearing in which the tool-holder may be revolved at any such position.

In operating with my implement controlled by the attachment above described, any milling-tool being grasped in the tool-holder, and the main vertical shaft of the drill-press being rotated as the tool enters into the work, such tool may be made to traverse any path within the range of adjustability of the tool-holder by the operator rotating the sleeve M and the worm L in the proper direction by means of their handles. Such shifting of the position of the tool-holder will at no time interrupt its rotary motion, and the tool grasped therein may thereby be made to cut grooves of any desired shape or to engrave or trace the surface of the work with any desired pattern.

For the purpose of work in wood or for tracing or merely working the surface a much simpler contrivance may be used—as, for example, such a device as illustrated in Fig. 13, wherein the eye N' is on the end of an arm $N^{10}$, which is longitudinally slotted and supported upon flat-topped post W, secured to the bed and guided about a stud $w$ at the top of the post, entering the slot $n^{10}$ in the arm $N^{10}$ of the eye. The said arm $N^{10}$, being provided with two handles $N^{11} N^{11}$, may be given any desired movement by hand to cause the eye N' and the tool therein to follow any desired path. This device is adapted to be used as a bed or fixed head to hold work to be operated upon in a drill-press or lathe, and when designed for that purpose the boss, which constitutes the tool-holder, will be omitted, and the base may no longer require the central spindle, but may be otherwise secured directly to the machine, or may be secured by means of such spindle if the machine is adapted to that mode of securing the bed, and the flange or guard-plate $E^3$ will be made in the usual form of a bed or work-receiving head, being provided with the radial grooves or other devices by which the dogs O may be secured thereto for the purpose of holding work. When thus used, in order to shift such bed and the work thereon under the drill or under or opposite to the tool, I provide each of the trammels with an arm $D^2$, projecting from the middle of its longer side and from the surface thereof opposite the other trammel, such arm lying in a groove provided for it in the face-plate or base-plate, as the case may be, and protruding from the periphery of the implement. At the periphery I provide the trammel guide-block with lugs $B^2 B^2$, in which are journaled the interiorly-threaded sleeves P P, suitably retained by their flanges $p$ in the journal-boxes formed on said lugs, and having each a crank-arm and handle P' P', by which they may be rotated by hand. Through these threaded sleeves the arms $D^2 D^2$ of the trammels are screwed, or, to speak more correctly, the sleeves are screwed into the arms before the sleeves are laid in their bearings and the trammels are laid in the trammel-block. The parts being now assembled, as before described, and the entire implement being secured upon the bed of a drill-press or to the fixed head of a lathe, and the work to be operated upon being secured by the dogs upon the plate $E^3$, the work may be shifted within the range of movement permitted to the trammels in the implement by the operator rotating the handles of the two sleeves.

Figures 14, 15:
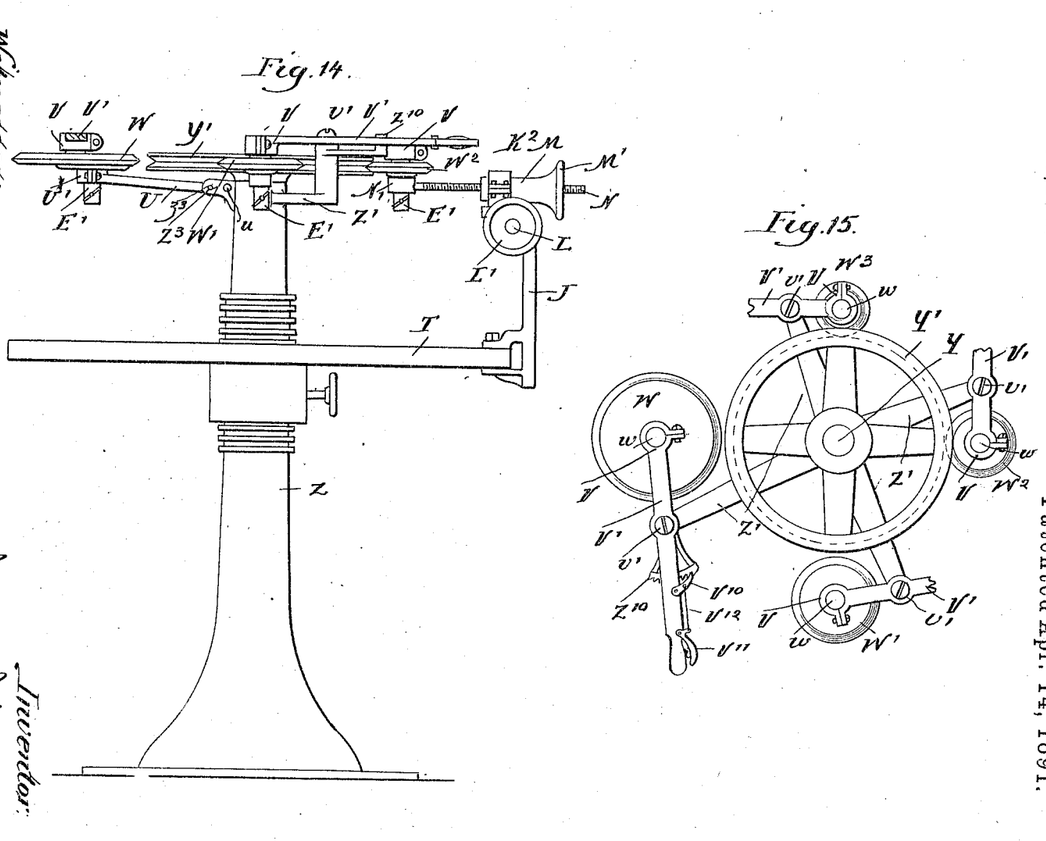
Fig. 14 is a from elev- tion of a several-spindle drill-press having    invention applied to its drill-holding chuck to communicate power to them from the central drive-wheel, so that they can be disconnected from such driving power with moving either the chuck-axis or the drive-wheel.
Fig. 15 is a plan of the same.

One of the most useful applications of this device is shown in Figs. 14 and 15, wherein it is utilized as a means of communicating power in a multiple-spindle drill-press from the central power-wheel to the several drills. In these figures, Z is the standard of the frame of the press, through which the power-communicating shaft Y extends vertically, receiving motion from any convenient point below the standard or through the bottom of it. Y' is the main power-wheel, fixed upon the upper end of the shaft Y, at the top of the standard Z. As illustrated, this power-wheel is a friction-wheel, having a V-shaped groove in its periphery, the design being to communicate motion by friction in such groove with the V-shaped peripheries of the several driven wheels W, W', $W^2$, and $W^3$. These several wheels are each constructed like the tool-holder illustrated in Figs. 1, 2, 3, 4, and 5, except that instead of the spindle A' they are each provided with the hub $w$, having a flange $w'$ at its upper end, said hub being journaled in a suitable box V provided at the end of the horizontal lever V', which is pivoted at $v'$ on the arm Z', which projects from the standard Z below the wheel Y' and reaches out past said wheel and then projects upward past it, so that the said pivot-bearing $b'$ is above the plane of the upper surface of both the wheels Y' and W W' $W^2$ $W^3$. A short segment-ratchet $Z^{10}$ is formed on the arm Z', and on the lever V' there is pivoted a dog $V^{10}$, adapted to engage the ratchet-teeth on the segment $Z^{10}$ and to be released by operating a finger-lever $V^{11}$, conveniently located near the handle of the lever V' and connected by a rod $V^{12}$ with the dog, this construction being a familiar one for similar purposes. It will be seen that by swinging the lever V' horizontally the wheel journaled at the end of it may be thrown into frictional engagement with the wheel Y' or out of such engagement, as desired. A bearing is provided for the tool-holding sleeve E' in an arm U, projecting from the standard Z and having a suitable journal-box U' to afford such bearing at its outer end. When the machine is designed to be used only for drilling, this arm may be rigid with the standard Z; but I have illustrated it adapted to be made rigid with the standard or to be released and allowed to drop away from the tool-holding sleeve E' at the will of the operator, in order that in its place there may be substituted the adjustable bearing, such as is shown in Figs. 11 and 12. Such a device is illustrated in Figs. 14 and 15 in connection with the wheel $W^2$. It will be understood that the entire appliance there represented as being supported by being clamped onto the bed T may be set in position to be operated in conjunction with either of the other wheels W, W', or $W^3$. When used for drilling, the journal-box U should be fixed axially in line with the box V' when the wheel used is in contact with the driving-wheel Z', so that there will be no interior friction in the device.

The construction by which the arm U is adapted to be fixed rigidly in position or allowed to drop off from the sleeve E' at will is that it is pivoted at the inner end at $u$ between two lugs $Z^3$ $Z^3$, which extend a considerable distance horizontally from the standard Z and near their ends have holes $z^3$, adapted to receive a pin inserted horizontally through both lugs, and the arm U has, in proper position to be in line with these holes when said arm is extended horizontally, a hole adapted to admit such pin, and when the said arm is to be used as illustrated, being lifted to a horizontal position, the pin is inserted through the lugs and through the arm, thereby securing it in that position. When the pin is withdrawn, the arm may fall from the sleeve E', the cap of the box U' being loosened to permit it to slip off.

It will be understood that the style of machine to which these figures show my device applied as a frictional wheel is one in which the work table or bed T is adapted to revolve about the standard to shift the work to any position—that is, under or in the range of any one of the four tools operated by the four wheels W, W', $W^2$, and $W^3$. The appliances for adjusting the work-bed in such a machine would be the same as in any machine similarly provided with a rotating bed.

The construction illustrated in Figs. 6 to 9, inclusive, may be modified, as shown in Figs. 16 and 17, by the omission of the crank-arms and handles P' from the sleeves P, and instead causing said sleeves to protrude from their journal-boxes, the protruding portion being polygonal in cross-section, adapted to receive a wrench, and by providing the base-plate with an interiorly-threaded hub $A^2$ of the usual form to adapt it to be screwed to the revolving head of a lathe, and when thus modified the device may be used to hold work in the revolving lathe-head to be operated upon by a tool held in the fixed center of the lathe, the work being adjusted by means of wrenches operating upon the wrench-heads of the sleeves in the same manner as in the fixed bed it would be adjusted by the crank-handles P'. Any mechanic will understand how this implement arranged in this way would be useful for the purpose described in lathe-work by affording facility for bringing any point of the work to the center for reaming out or countersinking holes or centering other portions of the work to be dressed off by fixed tools in the tool-head.

Figure 18:
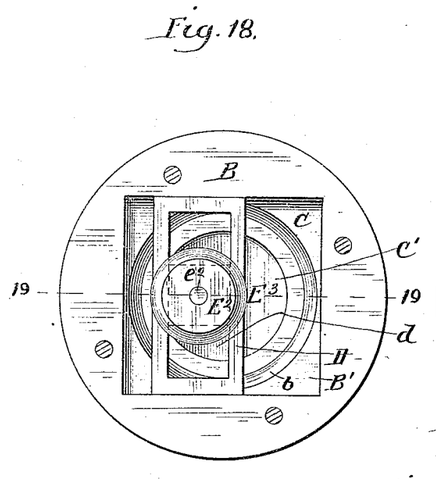
Fig. 18 is a view of the same character as Fig. 2, but showing a construction with only one trammel.
Figure 19:
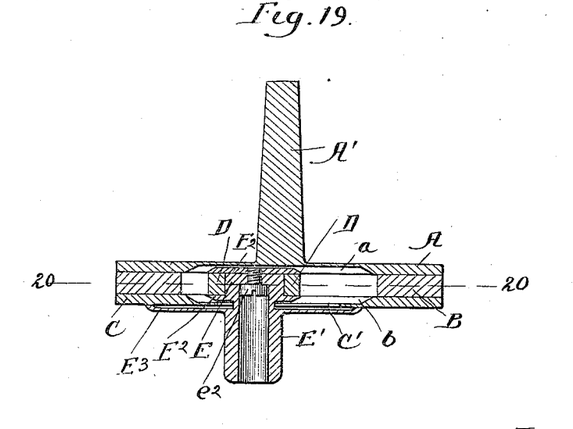
Fig. 19 is a section through a device such as shown on Fig. 18, section being made at the plane indicated by the line 19 19 on Fig. 18.
Figure 20:
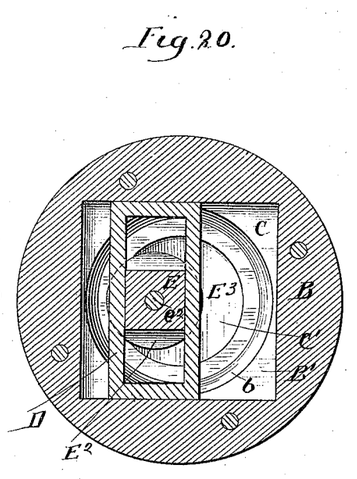
Fig. 20 is a section at the line 20 20 on Fig. 19.

For the purpose of use in the manner indicated in Figs. 1 to 5, inclusive, and in Figs. 11 to 15, inclusive, it is not essential that there should be two trammels, one being sufficient to produce and control the movements, as described, the trammel being guided in one direction in the trammel-block by the two opposite parallel sides of the opening in the trammel guide-block or cavity in the base, and the trammel-block being guided in the transverse direction by the two opposite parallel sides of the opening in the trammel, and the directions of the remaining sides of the openings in the trammel guide-block and in the trammel are obviously immaterial—that is, it is immaterial whether these openings are parallelogrammic, provided only the opening in the trammel guide-block or cavity in the base have two parallel sides and that the trammel have two parallel ends which cause it to be guided by the parallel sides of said opening, and provided the opening in the trammel have two parallel sides and the trammel-blocks have two parallel edges which adapt it to be guided by the parallel sides of the opening in the trammel, said parallel sides of the opening in the trammel being transverse to the direction of the parallel sides of the trammel by which it is adapted to be guided, as stated, in the trammel guide-block; and I do not by the word "transverse" in this connection limit myself to ninety degrees difference between the two directions described as transverse to each other, although the most uniform action, least friction, and therefore the best results are probably obtainable when the direction of the guiding sides of the trammel guide-block or cavity in the base is at right angles to that of the guiding sides of the opening in the trammel. When two trammels are used, this difference of direction, being ninety degrees, causes the opening in the trammel to be rectangular, as above described. Two trammels are essential when the instrument is to be used in the manner indicated in Figs. 6, 7, 8, 9, 10, 16, and 17. The construction with one trammel is illustrated in Figs. 18, 19, and 20.

I claim—

1. In combination with the base having a cavity which has two opposite parallel sides, a trammel located in such cavity and extending between such parallel sides and guided thereby in said opening, such trammel having an opening with two parallel sides whose direction is transverse to that of the parallel sides of the cavity, and a trammel-block sliding in said opening in the trammel and guided by the parallel sides of its said opening, substantially as set forth.

2. In combination with the base having a cavity which has two opposite parallel sides, a trammel located in such cavity and extending between such parallel sides and guided thereby in said opening, such trammel having an opening with two parallel sides, whose direction is transverse to that of the parallel sides of the cavity, and a trammel-block sliding in said opening in the trammel and guided by the parallel sides of its said opening and provided with means for holding rigid with it a tool or work, substantially as set forth.

3. In combination with the base adapted to be secured at its center in a bearing or to a revolving shaft and having an opening with two opposite parallel sides, a trammel located in such opening and extending between such parallel sides and guided thereby when sliding in said opening, such trammel having an opening with two opposite parallel sides whose direction is transverse to that of the parallel sides of the opening in the base, and a trammel-block sliding in said opening in the trammel and guided by the parallel sides of said opening, the face-plate overlying said trammel and retaining it in said cavity in the base, said face-plate having a central opening and said trammel-block protruding from said opening and adapted at such protruding part to be journaled and rotated in a bearing, and a bearing for the same adjustable and adapted to be fixed at will with respect to the base, substantially as and for the purpose set forth.

4. In combination with the base having a parallelogrammic cavity, the oblong parallelogrammic trammels located transversely to each other in such cavity and guided by its parallel sides, respectively, and having oblong parallelogrammic openings, and a trammel-block whose dimensions respectively equal the lesser dimensions of the openings in said trammels, respectively, said trammel-block being inserted through said openings in the trammels where they overflow each other, substantially as set forth.

5. In combination with the base having a rectangular parallelogrammic cavity and the oblong rectangular trammels located transversely to each other in said cavity and guided by its parallel sides, respectively, and having oblong rectangular openings, a rectangular trammel-block whose dimensions respectively equal the lesser dimensions of the openings in the trammels, respectively, said block being inserted through said openings where they overlie each other, substantially as set forth.

6. In combination with the base having a square cavity and the equal oblong rectangular trammels located transversely to each other in such cavity and guided by its sides and having equal oblong rectangular openings, a square trammel-block whose dimension equals the lesser dimension of the openings in the trammels, said block being inserted through said openings where they overlie each other, substantially as set forth.

7. In combination with the base having a parallelogrammic cavity, the oblong parallelogrammic trammels located transversely to each other in said cavity and guided by its parallel sides, respectively, and having the oblong parallelogrammic openings, a trammel-block whose dimensions respectively equal the lesser dimensions of the openings in the trammels, respectively, said block being inserted through said openings where they overlie each other and provided with means for holding rigid with it a tool or work, substantially as set forth.

8. In combination with the base having a parallelogrammic cavity, the oblong parallelogrammic trammels located transversely to each other in said cavity and guided by its parallel sides, respectively, and having oblong parallelogrammic openings, a trammel-block whose dimensions respectively equal the openings in the trammels, respectively, the said block being inserted through said openings where they overlie each other and the face-plate overlying said trammels and secured to the base and having a central opening, said block protruding through said opening and made circular at such protruding part, whereby it is adapted to be journaled and rotated in a bearing, and a bearing for the same adjustable and adapted to be fixed at will with respect to the base, whereby the trammel-block may be located eccentrically with respect to the cavity in the base, substantially as set forth.

9. In combination with the base having a hub or spindle and having a cavity which is parallelogrammic in a plane transverse to the axis of said hub or spindle, the oblong parallelogrammic trammels located transversely to each other in such cavity and guided by its parallel sides, respectively, and having the oblong parallelogrammic openings, a trammel-block whose dimensions respectively equal the dimensions of the openings in the trammels, respectively, said block being inserted through said openings where they overlie each other and projecting in a direction parallel to the axis of the spindle of the base, and a bearing or journal-box for said projecting part adjustable and adapted to be fixed as adjusted with respect to the spindle-axis of the base, substantially as and for the purpose set forth.

10. In combination with the revolving power-wheel and the standard in which it is journaled, a wheel adapted to be rotated by the engagement with said revolving wheel, a bearing for the driven wheel adjustable toward and from the driving-wheel, said driven wheel consisting of a base adapted to be supported at its center in said adjustable bearing and having a cavity with two opposite parallel sides on the face opposite such bearing, a trammel located and sliding in such cavity and guided by its said parallel sides and having an opening with two parallel sides in a direction transverse to that of the parallel sides of the cavity in the base, the trammel-block located and sliding in said opening in the trammel, guided by the parallel sides of said opening and protruding from the trammel on the opposite side from the bearing of said wheel, and a bearing in which such protruding part of the trammel-block is journaled, substantially as set forth.

11. In combination with the revolving power-wheel and the standard in which it is journaled, a wheel adapted to be rotated by the engagement with said revolving wheel, a bearing for the driven wheel adjustable toward and from the driving-wheel, said driven wheel consisting of a base adapted to be supported at its center in said adjustable bearing and having a cavity with two opposite parallel sides on the face opposite such bearing, a trammel located and sliding in such cavity and guided by its said parallel sides and having an opening with two parallel sides in a direction transverse to that of the parallel sides of the cavity in the base, the trammel-block located and sliding in said opening in the trammel, guided by the parallel sides of said opening and protruding from the trammel on the opposite side from the bearing of said wheel, and a bearing in which such protruding part of the trammel-block is journaled, the axis of said bearing being coincident with the axis of the bearing of the driven wheel when said wheel is in contact with the driving-wheel, substantially as set forth.

12. In combination with the revolving power-wheel and the standard in which it is journaled, a wheel adapted to be rotated by the engagement with said revolving wheel, a bearing for the driven wheel adjustable toward and from the driving-wheel, said driven wheel consisting of a base adapted to be supported at its center in said adjustable bearing and having a cavity with two opposite parallel sides on the face opposite such bearing, a trammel located and sliding in such cavity and guided by its parallel sides and having an opening with two parallel sides in a direction transverse to that of the parallel sides of the cavity in the base, the trammel-block located and sliding in said opening in the trammel, guided by the parallel sides of said opening, and protruding from the trammel on the opposite side from the bearing of said wheel, and a bearing in which such protruding part of the trammel-block is journaled, said bearing being adjustable at will in a plane transverse to its axis, substantially as set forth.

In testimony whereof I have hereunto set my hand, at Chicago, Illinois, in the presence of two witnesses, this 19th day of April, A.D. 1890.

ANDREW JOHNSON.

Witnesses:
CHAS. S. BURTON,
JEAN ELLIOTT.